(12) United States Patent
Hao et al.

(10) Patent No.: US 7,779,344 B1
(45) Date of Patent: Aug. 17, 2010

(54) SYSTEM AND METHOD FOR CREATING A VALUE-BASED STACKED BAR CHART

(75) Inventors: Ming C. Hao, Palo Alto, CA (US); Umeshwar Dayal, Saratoga, CA (US); Martha Lyons, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 11/590,188

(22) Filed: Oct. 31, 2006

(51) Int. Cl.
*G06F 17/18* (2006.01)

(52) U.S. Cl. ............... 715/215; 345/440.2; 715/275

(58) Field of Classification Search ............ 345/440.2; 715/215, 275
See application file for complete search history.

(56) References Cited

U.S. PATENT DOCUMENTS

| | | | |
|---|---|---|---|
| 5,742,778 A | 4/1998 | Hao et al. | |
| 5,828,866 A | 10/1998 | Hao et al. | |
| 5,999,193 A * | 12/1999 | Conley et al. | 345/440 |
| 6,377,287 B1 | 4/2002 | Hao et al. | |
| 6,845,380 B2 | 1/2005 | Su et al. | |

(Continued)

FOREIGN PATENT DOCUMENTS

| | | |
|---|---|---|
| WO | WO01/37072 | 5/2001 |
| WO | WO02/25482 | 3/2002 |
| WO | WO03/032125 | 4/2003 |
| WO | WO03/040957 | 5/2003 |
| WO | WO2004/057458 | 7/2004 |
| WO | WO2004/111874 | 12/2004 |
| WO | WO2006/048802 | 5/2006 |

OTHER PUBLICATIONS

Keim, Daniel C. et al. "Hierarchical Pixel Bar Charts" from IEEE Transactions on Visualization and Computer Graphics, vol. 8 No. 3 (pp. 255-269). Sep. 2002, IEEE.*

(Continued)

*Primary Examiner*—Stephen S Hong
*Assistant Examiner*—Tyler J Schallhorn (57) ABSTRACT

There is provided a system and method for creating a value-based stacked bar chart. More specifically, in one embodiment, there is provided a computer readable medium comprising code adapted to sort a plurality of data entries by transaction value, wherein the plurality of data entries correspond to a stack type; code adapted to assign each of the plurality of data entries to one or more cells associated with the stack type, code adapted to assign a color to the one or more cells, and code adapted to shade the color of a subset of the one or more cells based on the transaction value of the data entries assigned to the cells in the subset.

18 Claims, 7 Drawing Sheets

U.S. PATENT DOCUMENTS

| | | |
|---|---|---|
| 6,980,465 B2 | 12/2005 | Toussig |
| 7,046,247 B2 | 5/2006 | Hao |
| 7,567,250 B2* | 7/2009 | Hao et al. ................ 345/440 |
| 2003/0071815 A1* | 4/2003 | Hao et al. ................ 345/440 |
| 2003/0142094 A1* | 7/2003 | Zhang ..................... 345/440 |
| 2004/0080514 A1 | 4/2004 | Dorwart |
| 2004/0205450 A1* | 10/2004 | Hao et al. ................ 715/277 |
| 2006/0059439 A1 | 3/2006 | Hao |
| 2006/0129914 A1* | 6/2006 | Ellis et al. ................ 715/504 |
| 2009/0160861 A1* | 6/2009 | Nakano .................... 345/440 |

OTHER PUBLICATIONS

Hao, Ming C. et al. "Geo Pixel Bar Charts" from Proceedings of the 14th IEEE Visualization Conference. 2003, IEEE Computer Society.*

Van Wijk, Jarke J. et al. "Cushion Treemaps: Visualization of Hierarchical Information" from the 1999 IEEE Symposium on Information Visualization. Oct. 29, 1999, IEEE.*

Daniel A. Keim, Ming C. Hao, Umeshwar Dayal, and Martha Lyons, Value-Cell Bar Charts for Visualizing Large Transaction Data Sets, IEEE, Sep. 2, 2006.

* cited by examiner

| TRANSACTION DATE | TRANSACTION VALUE ($) | CUSTOMER |
|---|---|---|
| 10/1/2004 | 224 | A |
| 10/1/2004 | 819 | B |
| 10/1/2004 | 38 | B |
| ⋮ | ⋮ | ⋮ |
| 1/1/2005 | 87 | A |
| 1/1/2005 | 38 | B |
| 1/1/2005 | 216 | C |
| 1/1/2005 | 914 | A |
| 1/1/2005 | 2230 | C |
| 1/1/2005 | 820 | B |
| 1/1/2005 | 92 | C |
| 1/1/2005 | 345 | A |
| ⋮ | ⋮ | ⋮ |
| 2/28/2005 | 625 | C |
| 2/28/2005 | 15 | A |
| 2/28/2005 | 42 | C |
| 2/28/2005 | 97 | C |
| 2/28/2005 | 30 | C |
| 2/28/2005 | 14 | C |
| 2/28/2005 | 53 | A |
| 2/28/2005 | 546 | B |
| 2/28/2005 | 100 | C |
| 2/28/2005 | 84 | C |
| 2/28/2005 | 63 | A |
| 2/28/2005 | 553 | A |

FIG. 4

| TRANSACTION DATE (62a) | TRANSACTION VALUE ($) (62b) | CUSTOMER (62c) |
|---|---|---|
| 1/1/2005 | 87 | A |
| 1/1/2005 | 914 | A |
| 1/1/2005 | 345 | A |
| ● | ● | ● |
| 1/1/2005 | 38 | B |
| 1/1/2005 | 820 | B |
| ● | ● | ● |
| 1/1/2005 | 216 | C |
| 1/1/2005 | 216 | C |
| 1/1/2005 | 216 | C |

SYSTEM AND METHOD FOR CREATING A VALUE-BASED STACKED BAR CHART

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, the modern business climate can be extremely competitive. In order to thrive in this competitive global market place, companies generally need to be able to recognize and react to trends and changes in both their markets and their customers. For example, it may be advantageous to recognize profitability trends in certain market sectors or certain customer types. However, the global market place is also increasingly complex, and it may be difficult to recognize trends amongst the tens of thousands or more data items that make up a modern commercial data set (e.g., sales records).

One conventional technique for recognizing trends or other information in a large data set is with charts. Charts may enable relatively large amounts of data to be displayed relatively efficiently, allowing trends or other features of the data to be identified. However, only those features of the data set which are displayed in the chart benefit from these advantages. Early charts, such as simple bar charts, were only able to display highly aggregated data (e.g., total sales volume, total sales amount, and so-forth). Later charts, such as, conventional stacked bar charts, advantageously enabled display of volumetric sub-divisions within the aggregated data. However, conventional stacked bar charts are still not able to display value distinctions.

A system and method for creating an improved graphic display of complete data would be desirable.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more of the embodiments set forth herein are directed towards a system and/or method for creating a value-based stacked bar chart. For example, in one embodiment, there is provided a method comprising sorting a plurality of data entries by transaction value, wherein the plurality of data entries correspond to a stack type, assigning each of the plurality of data entries to one or more cells associated with the stack type, assigning a color to the one or more cells, and shading the color of a subset of the one or more cells based on the transaction value of the data entries assigned to the cells in the subset.

Figure 1:
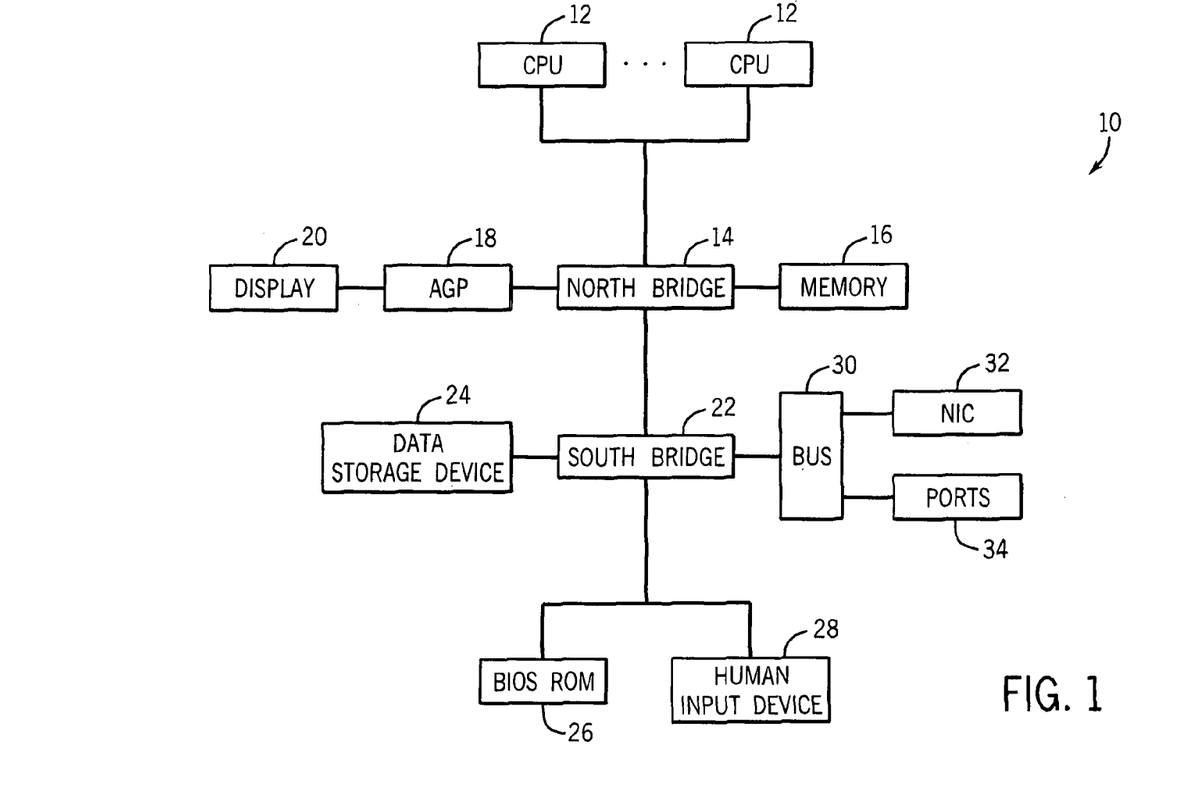
FIG. 1 is a block diagram of an exemplary computer system configured to create a value-based stacked bar chart in accordance with one embodiment.

Turning now to FIG. 1, a block diagram of an exemplary computer system configured to create a value-based stacked bar chart in accordance with one embodiment is illustrated and generally designated by a reference numeral 10. The computer system 10 may include one or more processors or central processing units ("CPUs") 12. While the CPU 12 will be referred to primarily in the singular, it will be understood that a computer system 10 with any number of physical or logical CPUs 12 may be implemented. Examples of suitable CPUs 12 include the Intel PENTIUM™ 4 Processor, the Intel XEON™ Processor, the AMD OPTERON™, and so forth.

Figure 8:
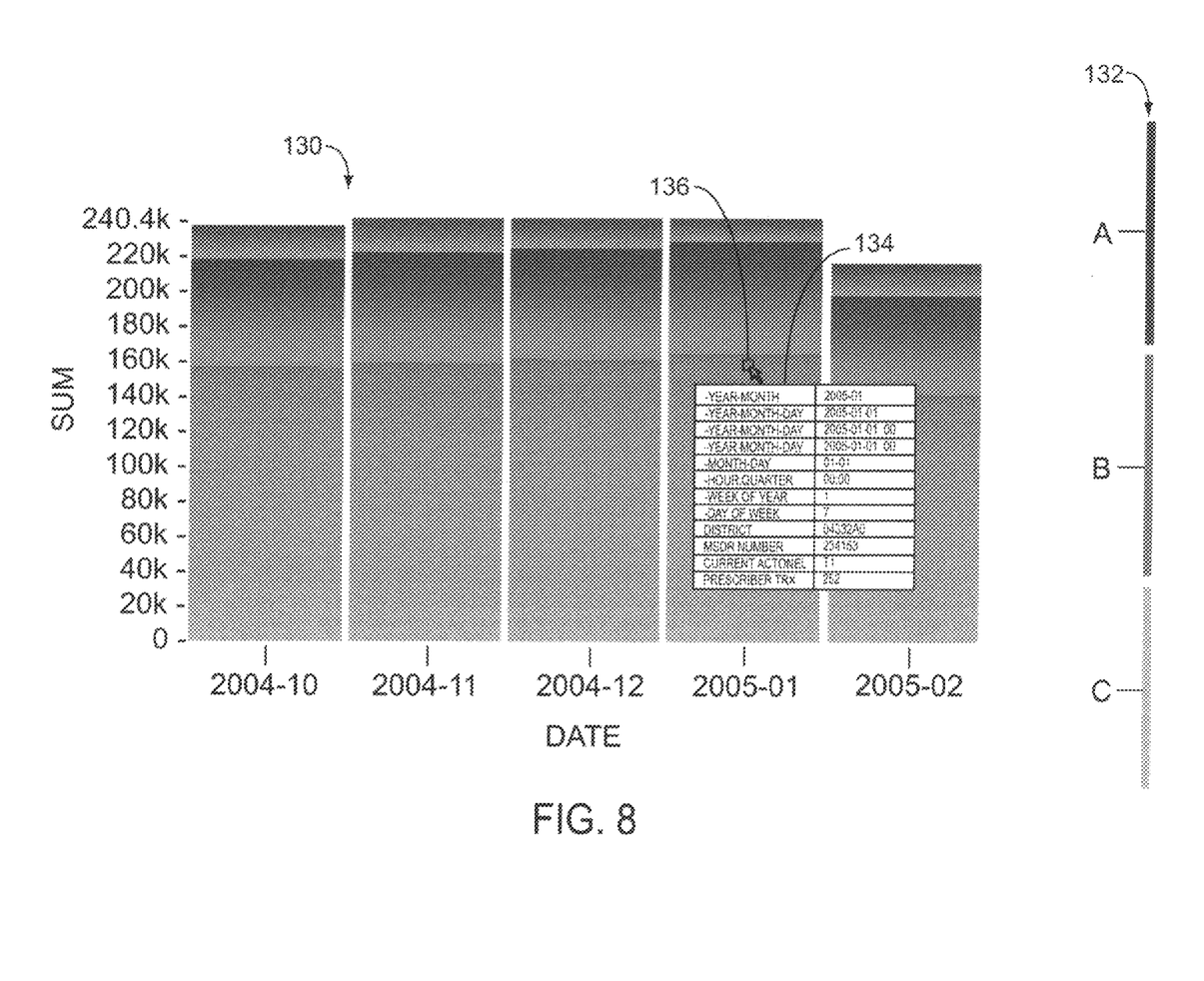
FIG. 8 is graphical representation of an exemplary value-based stacked bar chart of the data set of FIG. 3 in accordance with one embodiment.

The CPU 12 may be communicatively coupled to a north bridge 14, such as an Intel 82451NX Memory and I/O Bridge Controller ("MIOC"). The north bridge 14 may be an interface (either directly or indirectly) between the CPU 12 and the rest of the components of the system 10. The north bridge 14 may contain a memory controller for accessing a main memory 16 (e.g., dynamic random access memory ("DRAM")). The north bridge 14 may also be communicatively coupled to a graphical interface, such as an accelerated graphics port ("AGP") 18. For example, the AGP 18 can transmit graphical data through an AGP video card (not shown) to a video display 20, which can display the graphical data for a user. For example, in one embodiment, the video display 20 may display a value-based stacked bar chart, as illustrated in FIG. 8 (see below). In alternate embodiments, the north bridge 14 may be replaced or supplemented with a memory controller hub ("MCH") or other suitable component.

The north bridge 14 may also be communicatively coupled to a south bridge 22. The south bridge 22 is an integrated multifunctional component, such as the Intel 82371. The south bridge 22 may include a controller which may enable the south bridge 22 to communicate and/or control a data storage device 24. The data storage device 24 may include any one of a variety of suitable data storage devices. For example, in one embodiment, the data storage device 24 is an IDE or ATA hard drive. In alternate embodiments, the data storage device 24 may be a small computer system interface ("SCSI") drive or a fibre channel drive. In still other embodiments, the data storage device 24 may be a solid state data storage device or optical data storage device. Moreover, in alternate embodiments, the south bridge 22 may be replaced or supplemented with an input/output control hub ("ICH") or other suitable component. Further, in some embodiments, the functionality of the south bridge 22 and north bridge 14 (amongst other functions) may be combined into a single component.

The south bridge may also be coupled to a basic input/output system ("BIOS") read-only memory ("ROM") 26. The BIOS ROM 26 may be configured to store code or instructions for setting up or configuring the operation of the computer system 10. The south bridge 22 may also be coupled to a variety of human input devices 28, such as the keyboard and/or a mouse. Further, while not illustrated in FIG. 1, the south bridge 22 may also include an enhanced direct memory access ("DMA") controller; an interrupt controller; a timer; a universal serial bus ("USB") host controller for providing a universal serial bus (not shown); and an industry standard architecture ("ISA") bus controller for providing an ISA bus (not shown). In one embodiment (not shown), the south bridge 22 may be coupled to the BIOS ROM 26 and the human input device 28 via a super I/O processor or other suitable interface component.

The south bridge 22 may also be communicatively coupled to an expansion bus 30. The expansion bus 30 may permit the addition of expansion cards into the computer system 10. The expansion bus 30 may employ any one of a number of suitable expansion bus technologies, including Peripheral Component Interconnect ("PCI"), PCI-X, PCI EXPRESS™, and the like. As such, it will be appreciated that PCI, PCI-X, and PCI EXPRESS™ are merely exemplary, and in alternate embodiments, other suitable expansion bus technologies may be employed as well.

The expansion bus 30 may be coupled to a network interface card ("NIC") 32. As will be appreciated, the NIC 32 may enable the computer system 10 to communicate with other computer systems and/or devices over a computer network. For example, in one embodiment, the computer system 10 may be configured to download a data set from another computer system on a computer network via the NIC 32. As will be appreciated, the NIC 32 may employ a variety of communication protocols, either wired or wireless, depending on the type of computer network that the computer system 10 is configured to employ.

The expansion bus 30 may be communicatively coupled to one or more ports 34. The expansion bus 30 may include any one of a number of suitable expansion buses, such as universal serial bus ("USB"), USB2, IEEE-1394, SATA, and so forth. The ports 34 may also be communicatively coupled any one of a number of external systems or devices, including storage devices, remote computers, and the like.

Further, it should be noted that the embodiment of the computer system 10 illustrated in FIG. 1 is merely one example of a computer system in accordance with an exemplary embodiment of the invention. Alternate embodiments may include thin client systems, distributed computer systems, servers, personal digital assistants, and/or wireless telephones. As such, in alternate embodiments, the above described elements may be reconfigured and/or certain elements omitted from the computer system 10. For example, as described above, in one alternate embodiment, the north bridge 14 and the south bridge 22 may be replaced by a single integrated chipset. In still other embodiments, the memory 16 and/or the ports 34 may be coupled directly to the CPU 12.

Figure 2:
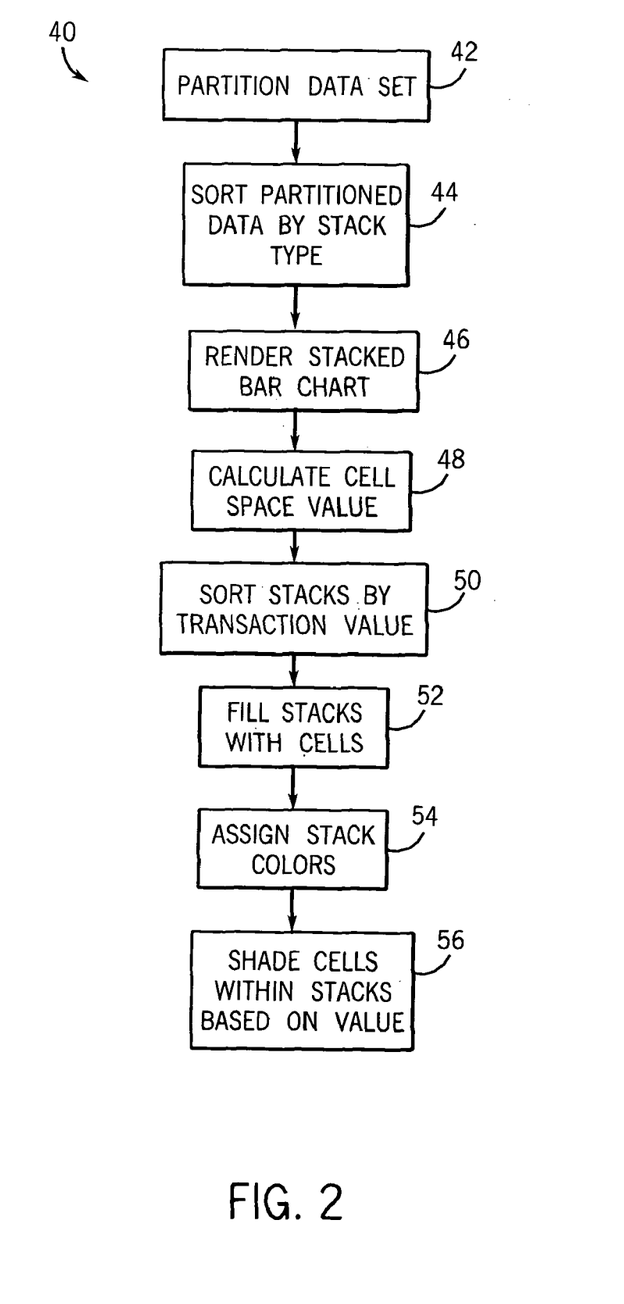
FIG. 2 is a flow chart illustrating a technique for creating a value-based stacked bar chart in accordance with one embodiment.

Turning next to FIG. 2, a flow chart illustrating an exemplary technique for creating a value-based stacked bar chart in accordance with one embodiment is illustrated and generally designated by reference numeral 40. In one embodiment, the technique 40 may be executed by the computer system 10 described above with regard to FIG. 1. For example, in one embodiment, code adapted to perform one or more of the function shown in blocks (42-56) of the technique 40 may be stored in the memory 16, the data storage device 24, or other suitable computer readable medium. In this embodiment, the CPU 12 may be configured to execute this stored code to perform the technique 40. In alternate embodiments, however, the technique 40 may be performed by any one of a number of suitable electronic devices, such as other computer systems, personal digital assistants ("PDAs"), cellular or wireless telephones, and the like.

As described above, the technique 40 is a technique for creating a value-based stacked bar chart in accordance with one embodiment. For ease of description, the technique 40 will be described in conjunction with FIGS. 3-8 to illustrate the creation of a value-based stacked bar chart.

Figure 3:
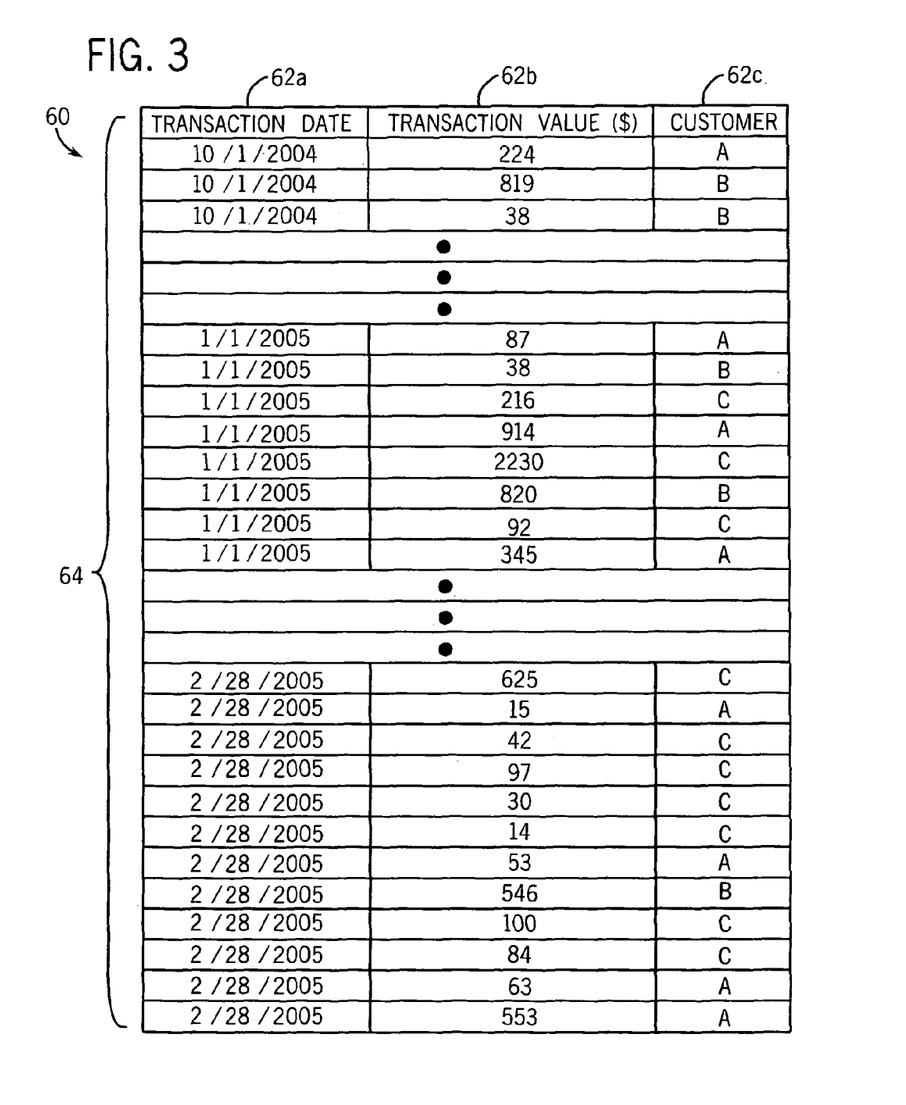
FIG. 3 is a spreadsheet illustrating a partial view of an exemplary data set in accordance with one embodiment.

As illustrated by block 42 of FIG. 2, the exemplary technique 40 begins by partitioning a data set, such as exemplary data set 60 illustrated in FIG. 3. In one embodiment, partitioning the data set may include dividing the data set 60 into one or more data groups, each of which contains one or more data entries from the data set 60 (e.g., transactions) and each of which corresponds to a desired bar on a stacked bar chart. Any one of a number of suitable data attributes may be employed to perform this grouping. For example, the data set 60 may be partitioned chronologically (e.g., by day, month, year, and so-forth), categorically (e.g., sales region, customer, and so-forth), or by another suitable data attribute. Moreover, the attribute used to partition the data set 60 may be provided by a user or other external source or may be generated by the computer system 10 itself based on the structure of the data set. For example, the computer system 10 may be configured to automatically identify a suitable attribute in the data set 60 and to partition the data set 60 using the identified attribute.

As described above, the technique 40 may begin by partitioning the data set 60. As illustrated in FIG. 3, the data set 60 may include a plurality of columns 62a, b, and c. Each of the columns may include data with a particular attribute. For example, in the illustrated embodiment, the column 62a contains transaction dates, the column 62b contains transaction values, and the column 62c contains customer names. The data set 60 may also include one or more rows 64 that intersect the columns 62a, b, and c. Each of the rows 64 may correspond to a data entry, such as a single transaction, including the data from each of the columns 62a, b, and c on that row 64. For example, the first row 64 of the data set 60 is a transaction by customer A with a transaction date of Oct. 1, 2004 and a transaction value of $224. Similarly, the last row of the data set 60 is a transaction for customer A with a transaction date of Feb. 28, 2005 and a transaction value of $5553. It will be appreciated, however, that both the structure and the data presented in FIG. 3 are merely exemplary. As such, in alternate embodiments, the columns 62 and/or the data contained therein may differ. For example, in alternate embodiments, the data set 60 may include columns 62 corresponding to a sales region, order quantity, order number, order status, sales representative, or other suitable attribute.

Returning now to block 42 of FIG. 2, in one embodiment, the technique 40 may include partitioning the data set 60 chronologically by month. In other words, the rows 64 in the data set 60 may be divided into five groups, each group containing transactions that occurred within a particular month. Those of ordinary skill in the art will appreciate that the data set 60 illustrated in FIG. 3 is already sorted chronologically in data order from Oct. 1, 2004 until Feb. 28, 2005. Advantageously, sorting the data set 60 in this manner enables relatively straightforward partitioning into groups based on month. Accordingly, in one embodiment, partitioning the data set may include presorting the data set 60 before partitioning. Alternatively, however, an unsorted data set may be partitioned "on the fly" (transaction by transaction) or partitioned in another suitable fashion.

As those of ordinary skill in the art will appreciate, a stacked bar chart comprises one or more graphical bars, each of which is divided into one or more stacks that each represent one facet of the data charted in each bar. For example, FIG. 5, which is described in greater detail below, contains a plurality of bars that each correspond to transactions that occurred within a particular month. Each of these bars is further divided (typically by color) into three stacks that indicate which customer is responsible for those sales. As described in further detail below, a stacked bar chart may serve as a foundation for creating a value-based stacked bar chart (see FIG. 8).

Figure 4:
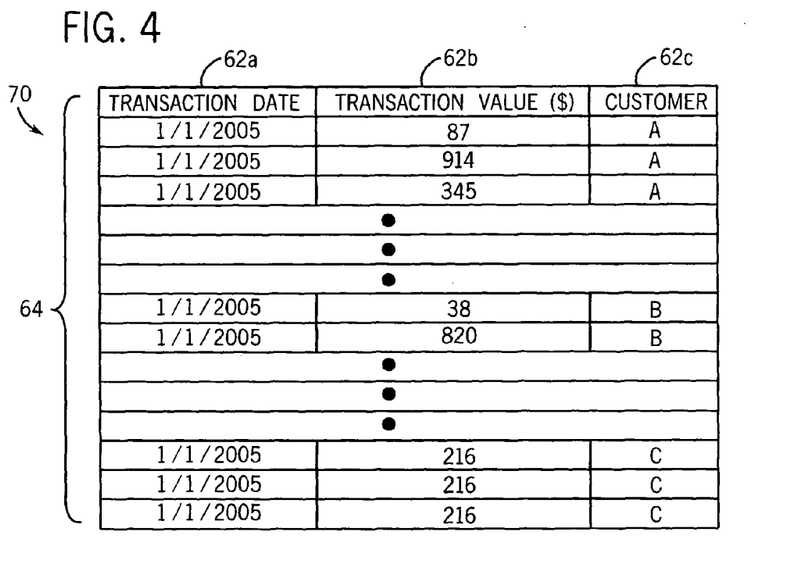
FIG. 4 is spreadsheet illustrating a partial data set including one partition of the data set of FIG. 3 sorted by stack type in accordance with one embodiment.

Creating a stacked bar chart involves sorting each of the partitions within the data set 60 by a stack type, as indicated by block 44. For example, an exemplary stacked bar chart may be partitioned by month and stacked by customer type. For this reason, in the illustrated embodiment, each of the partitions within the data set 60 are also sorted by stack type (e.g., customer). For example, FIG. 4 illustrates a partial data set 70 depicting one partition of the data set 60 (the month of January 2005) sorted by customer (i.e., stack type). As shown in FIG. 4, the partial data set 70 has been sorted by customer—namely customer A, B, or C. It will be appreciated, however, that in alternate embodiments, a stacked bar chart, such as FIG. 5, may be created without sorting the data set 60 in advance. Rather, in some embodiments, the stacks may be sorted "on the fly," as the stacked bar chart is created.

Figure 5:
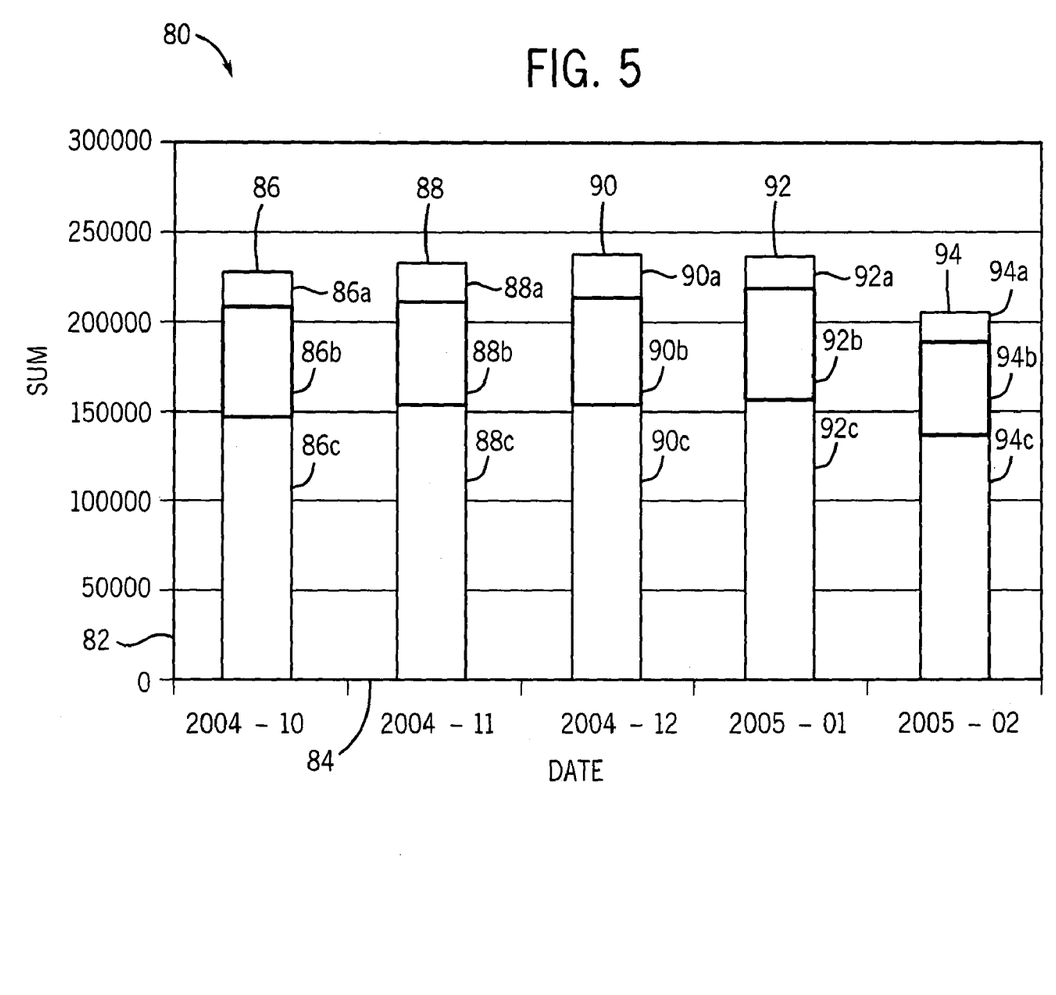
FIG. 5 is a stacked bar chart representative of the exemplary data set of FIG. 3 in accordance with one embodiment.

As described above, in one embodiment, the data set 60 may next be rendered into a stacked bar chart, as illustrated by block 46 of FIG. 2. For example, FIG. 5 is a stacked bar chart 80 of the data set 60 in accordance with one embodiment. The stacked bar chart 80 includes a y-axis 82 and an x-axis 84. As illustrated, the x-axis 84 corresponds to month and the y-axis 82 corresponds to a total value of the transaction values for the transactions that occurred within a particular month. As such, the bars 86-94 each represent the sum of the transaction values for a particular month. For example, the bar 86 represents the total for October 2004, the bar 88 represents the total for November 2004, and so-forth. It will be appreciated that each of the bars 86-94 has the same width but has a height that varies based on the total of that transaction represented by that bar. Moreover, as those of ordinary skill in the art will appreciate, both the height and the width of the bars 86-94 may be partially based on the resolution of the display 20. For example, if the display 20 is capable of displaying 1080 pixels by 760 pixels, the computer system 10 may select the height and width of the bars 86-94, such that the bars 86-94 will fit on the display 20 when the bars 86-94 are proportioned as set forth above.

In addition, each of the bars 86-94 may also include one or more stacks, which are labeled in FIG. 5 with references numerals 86a,b,c-94a,b,c. More specifically, the bar 86 contains stacks 86a, 86b, and 86c; the bar 88 contains stacks 88a, 88b, and 88c; and so forth. As described above, each of the stacks illustrated in FIG. 5, correspond to one facet (e.g., customer) of the transactions within each of the bars 86-94. For example, the stack 92a corresponds to the transactions in January 2005 by customer A, the stack 92b corresponds to the transactions in January 2005 by customer B, and the stack 92c corresponds to the transactions in January 2005 by customer C. Each of the stacks within the other bars 86-94 similarly correspond to the transactions by the customers A, B, and C within the other illustrated months. In this way, the stacked bar chart 80 provides a representation of not just the total value of the transaction within the bar, but also a representation of which customers were responsible for those transactions and in what amounts. Moreover, as will be described further below, the stack bar chart 80 also provides a foundation on which to create a value-based stacked bar chart.

Although the stacked bar chart 80 is illustrated in FIG. 5, it will be appreciated that the computer system 10 may not actually render or display the bar chart 80. Rather, the components of the stacked bar chart 80 may be calculated by the computer system 10 and applied in memory without ever being rendered or displayed. However, for the purpose of description, the stacked bar chart 80 is illustrated in the present application. Moreover, it will also be appreciated that the stacked bar chart 80 of FIG. 5 is merely illustrative. As such, in alternate embodiments, the data set 60 may be partitioned differently, sorted by another suitable attribute, or rendered as a stacked bar chart in another suitable manner.

As described above, each of the stacks 86a,b,c-94a,b,c in the value-based stacked bar chart 80 may include a plurality of cells that represent the underlying transactions associated with each stack. Accordingly, the technique 40 may also include computing a value, referred to as a "cell space value," for the value of the space occupied by each cell, as indicated by block 48. In other words, because the height of the bars 86-94 (and the stacks within them) correspond to the value of the transactions within that bar (or stack), and because the width of the bars 86-94 are fixed, the area of the stacks 86a,b,c-94a,b,c (and the stacks within them) correspond to the total value of the transactions within them. Accordingly, a cell placed within one of the bars 86-94 will occupy some fraction of the area of the bar and, thus, have a cell space value proportional to a percentage of the area of the stacks 86a,b, c-94a,b,c occupied by the cell.

More specifically, in one embodiment, the cell space value may be computed by dividing the total value of one of the stacks 86a,b,c-94a,b,c by the number of pixel within that stack and multiplying that ratio by the pixel size of a cell. In one exemplary embodiment, the pixel size of the cell ("cell size") is provided by a user or preprogrammed into the computer system 10. For example, in one embodiment, the cell size is 9 pixels. In alternate embodiments, the computer system 10 may be configured to calculate a cell size based on the structure of and/or values within the data set 60.

Figure 6:
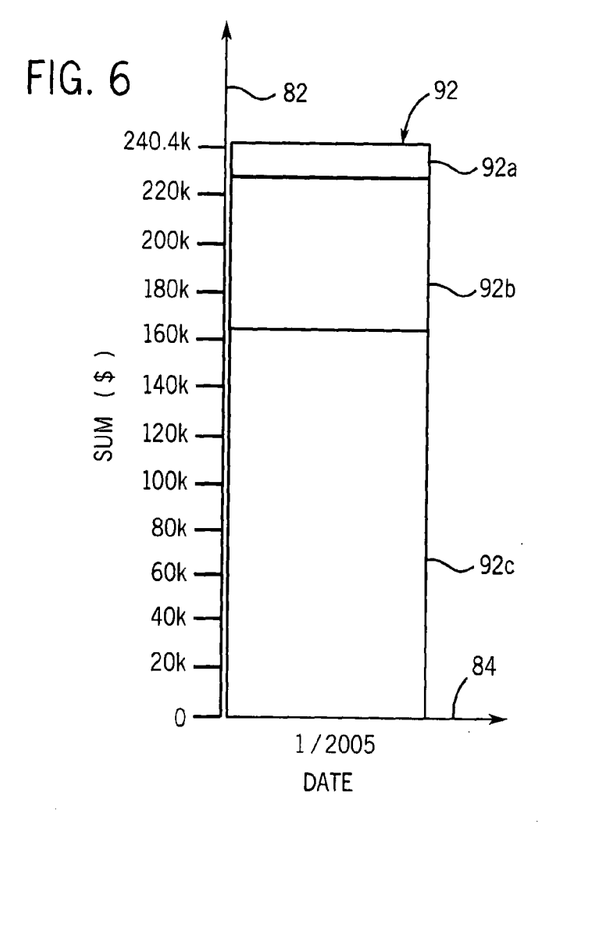
FIG. 6 is an enlarged view of one bar of the stacked bar chart of FIG. 5 in accordance with one embodiment.

FIG. 6 illustrates a larger view of the bar 92 of FIG. 5 in accordance with one embodiment. As previously shown, the bar 92 comprises three stacks: 92a, 92b, and 92c. As described above, calculating the cell size may involve dividing the total value of one of the stacks 92a,b,c by the pixel area of the stack 92a,b,c and multiplying that ratio by the cell size. For example, if the stack 92c has a total value of $164,000, the stack area is 5760 pixels, and the cell size is 9 pixels, the cell space value would be approximately $256 (i.e., ($164,000/5760)*9). It will appreciated, however, that these values are merely exemplary, and, as such, were selected for ease of illustration. Accordingly, in alternate embodiments, other suitable stack values, stack areas, and/or cell sizes may be employed. Moreover, in some embodiments, the cell space value may also be computed based on the area of the entire bar 86-94 and the total value of the entire bar 86-94.

Returning to FIG. 2, the technique 40 may also include sorting the data entries (e.g., transactions) within each of the stacks 86a,b,c-94a,b,c by cell value. More specifically, in the embodiment illustrated in FIGS. 4 and 5, sorting the stacks by cell value may involve sorting the transactions for each particular customer (A, B, or C) by transaction value, as indicated by block 50 of FIG. 2. For example, in one embodiment, the transactions within each stack may be sorted from lowest value to highest value.

Figure 7:
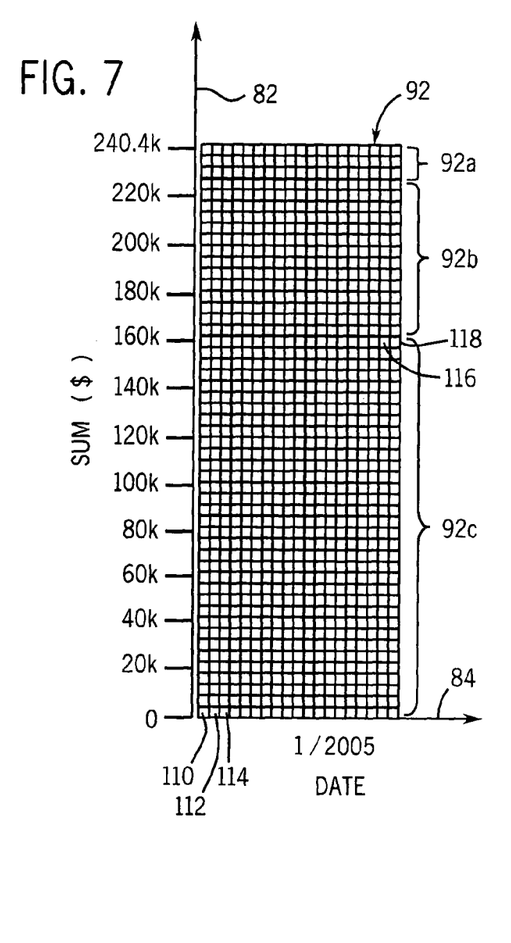
FIG. 7 illustrates the bar of FIG. 6 after cells have been added to the stacks of the bar in accordance with one embodiment.

Once the stack transactions have been sorted, the technique 40 may involve filling each of the stacks 86a,b,c,-94a,b,c with cells, as indicated by block 52 of FIG. 2. For example, FIG. 7 illustrates the bar 92 filled with value-based cells in accordance with one embodiment. Accordingly, filling the stacks 86a,b,c-94a,b,c may involve assigning one or more transactions from the data set 60 corresponding to a particular one of the bars 86-94 and stacks 86a,b,c-94a,b,c to a cell within the corresponding stack 86a,b,c-94a,b,c.

In one embodiment, the cells within the stacks are filled from left to right and bottom to top. However, in alternate embodiments, other suitable filling techniques may be used. For example, looking at FIG. 7, the lowest transaction for customer C in the partial data set 70 may be assigned to the cell 110 (lower left corner). If the value of this lowest transaction exceeds the cell value of $256 (as described above), the remainder will be carried over to the next cell 112. If the value of the lowest transaction is less than the cell value of $256, the next lowest transaction will be applied next with any remainder being carried over to the next cell. In this way, each of the cells 110, 112, 114, and so forth are filled with the transactions of customer C until the cells 116 and 118 in the upper right hand corner of the stack 92c are filled. Furthermore, this same process may be executed on each of the stacks 86a,b,c-94a,b,c. However, it will be appreciated that in alternate embodiments, other suitable filling techniques may be employed. For example, in one embodiment, the stacks 86a,b,c-94a,b,c may be filled from the upper right hand corner to the lower left hand corner.

Returning once again to FIG. 2, the technique 56 may also include assigning colors to each of the stacks 86a,b,c-94a,b,c, as indicated in block 54. For the purposes of this document, it will be appreciated that the term "color" may include both traditional colors as well as shades of gray, patterns, or any other suitable visually distinctive form of marking. In one embodiment, each of the stacks types (e.g., customers in FIGS. 5-7) are assigned a different basic color. For example, the stacks for customer A may be assigned the color red, the stacks for customer B may be assigned the color green, and the stacks for customer C may be assigned the color yellow. The color is referred to as the "foundation color" for the stack, and may be employed by a user of the value-based stacked bar chart (see FIG. 8) to discern volumetric differences between the various stacks within the bars 86-94. In one embodiment, the color of the cell is the average value of the group of transactions contained in the cell.

In addition, the technique 40 also may involve shading the cells within each of the stacks based on cell value, as indicated by block 56. More specifically, in one embodiment, those cells associated with higher value transactions may be shaded darker than those cells associated with lower value transactions. In one embodiment, the cells within each of the stacks 86a,b,c-94a,b,c are shaded based on a shading scale that may include a table containing one or more shades and one or more ranges of transaction values corresponding to each of the shades. For example, the shading scale may indicate that a light shade corresponds to cells with an average transaction value between $0 and $200, a slightly darker shade corresponds to cells with average transaction values between $201 and $500, and so forth. In one embodiment, the shading scale may be calculated by the computer system 10 based on a distribution of transaction values. In other embodiments, the shading scale may be calculated based on other criteria or may be entered into the computer system 10 by a user. Moreover, in alternate embodiments, other suitable shading schemes may be employed. For example, in one alternate embodiment, darker shading may be used for cells with lower values.

As described above, the technique 40 is a technique for creating a value-based stacked bar chart. Accordingly, FIG. 8 is graphical representation of an exemplary value-based stacked bar chart 130 in accordance with one embodiment. As illustrated in FIG. 8, the value-based stacked bar chart 130 includes the bars 86-94, each of which includes three stacks 86a,b,c-94a,b,c corresponding to the transactions from customers A, B, and C, respectively. Moreover, each of the stacks 86a,b,c-94a,b,c contain a plurality of cells that represent the transaction values for the transactions within that particular bar 86-94. Advantageously, each of these cells is colored with a foundation color to indicate its stack and is shaded to indicate the value of the transactions associated with that cell. Shading provides a means for comparison of transaction values, for example with respect to their distribution, within a particular color's stack. For example, a viewer of the value-based stacked bar chart 130 would be able to discern the relative distribution of transaction values within each of the bars 86-94 by comparing the degree of shading within each respective bar.

As further illustrated in FIG. 8, the value-based stacked bar chart 130 may also include a legend 132, which may indicate the foundation colors corresponding to each of the stacks 86a,b,c-94a,b,c. For example, as illustrated, the legend 132 may include a listing of customers A, B, and C, as well as a display of the color associated with that stack. Moreover, although not illustrated, the legend 132 may also include an intensity legend. Furthermore, it will also be appreciated that additional data about the cells within the value-based stacked bar chart 130 may also be available through user interaction with the chart 130. For example, a user may be able to garner additional detail (box 134) associated with a particular cell or group of cells by selecting the cell (e.g., pointing a pointer or cursor at the cell or clicking on a cell with a mouse). Some examples of sub-categories to drill down to for the bar as well as those illustrated are drill down from months to days (individual days in the month), all the sales districts for the month or a product number (e.g., MSDR Number), etc. Alternatively, the user may also click on a cell to "drill down," hierarchically to another chart associated with the cell. For example, the drill down display 134 shows the contents of a cell 136 showing the contents of a record or group of records associated with the cell which content provides information about the cell's associated transaction(s), e.g., the sales district, the day of the month (01-01), the day of the week, the MSDR number, etc.

In conclusion, the value-based stacked bar chart 130 advantageously displays high value transactions more visibly than lower value transactions. In this way, users of the value-based stacked bar chart 130 may be able to more rapidly detect correlations, patterns, or trends in the data set 60. In addition, the value-based stacked bar chart 30 enables the display of more detailed value data than conventional aggregation-based stacked bar charts. Moreover, the value-based stacked bar chart 130 also displays value-based data in such a way that it may be relatively easy for a user to identify how many transactions within each of the stacks 86a,b,c-94a,b,c are above and/or below a particular value threshold or thresholds.

While the invention described above may be susceptible to various modifications and alternative forms, specific embodiments have been shown by way of example in the drawings and have been described in detail herein. It should be understood, however, that the invention is not intended to be limited to the particular embodiments disclosed.

What is claimed is:

1. A computer readable medium having code stored thereon, the code stored thereon comprising:
   code adapted to sort a plurality of data entries by transaction value, wherein the plurality of data entries correspond to a stack type;
   code adapted to assign each of the plurality of data entries to one or more cells associated with the stack type, wherein the code adapted to assign each of the plurality of data entries is further adapted to assign multiple data entries to a single cell if a value of one of the multiple data entries is less than a cell value;
   code adapted to assign a color to the one or more cells; and
   code adapted to shade the color of a subset of the one or more cells based on the transaction value of the data entries assigned to the cells in the subset.

2. The computer readable medium, as set forth in claim 1, the code stored thereon comprising:
   code adapted to partition the data entries into a plurality of data groups based on an attribute, wherein each of the data groups comprises data entries associated with one or more stack types.

3. The computer readable medium, as set forth in claim 1, the code stored thereon comprising code adapted to sort the partitioned data entries by stack type into a plurality of stacks.

4. The computer readable medium, as set forth in claim 3, wherein the code adapted to assign the color is configured to assign a different foundation color to each of the plurality of stacks.

5. The computer readable medium, as set forth in claim 1, wherein the code adapted to assign each of the plurality of data entries is adapted to assign multiple cells to a single data entry if a value of the single data entries is greater than a value of the cell.

6. The computer readable medium, as set forth in claim 1, the code stored thereon comprising code adapted to display the one or more cells as a stacked bar chart on a display.

7. The computer readable medium, as set forth in claim 6, the code stored thereon comprising code adapted to produce another bar chart if a user selects one of the cells displayed on the screen, wherein the another bar chart contains information associated with the selected cell.

8. The computer readable medium, as set forth in claim 6, the code stored thereon comprising code adapted to produce display a box containing information associated with one of the cells displayed on the screen if a user selects one of the displayed cells.

9. The computer readable medium, as set forth in claim 6, the code stored thereon comprising code adapted to calculate a cell space value for the one or more cells, wherein the cell space value corresponds to a ratio of a total value of the cell's stack divided by an area of the cell.

10. A computer system comprising:
    a processor for executing code adapted to
       sort a plurality of data entries by transaction value, wherein the plurality of data entries correspond to a stack type;
       assign each of the plurality of data entries to one or more cells associated with the stack type, wherein the code adapted to assign each of the plurality of data entries is adapted to assign multiple cells to a single data entry if a value of the single data entries is greater than a value of the cell;
       assign a color to the one or more cells; and
       shade the color of a subset of the one or more cells based on the transaction value of the data entries assigned to the cells in the subset;
    a graphical interface coupled to the processor; and
       a display, coupled to the graphical interface, the display displaying an image comprising a value-based stacked bar chart that includes one or more bars that each include one of more stacks, wherein the stacks include the one or more cells that represent one or more transactions from a data set with the plurality of data entries, wherein each of the one or more cells are shaded with the color that is indicative of the transaction value.

11. The computer system, as set forth in claim 10, comprising:
    a computer readable medium comprising code adapted to create the image.

12. The computer system, as set forth in claim 11, wherein the computer readable medium comprises a memory.

13. The computer system, as set forth in claim 10, wherein each of the plurality bars includes at least one stack with a stack type common to the other bars.

14. The computer system, as set forth in claim 13, wherein the stacks with the common stack type have the same foundation color.

15. A method, comprising:
    sorting, performed by a computer system, a plurality of data entries by transaction value, wherein the plurality of data entries correspond to a stack type;
    assigning, performed by the computer system, each of the plurality of data entries to one or more cells associated with the stack type;
    assigning, performed by the computer system, a color to the one or more cells;
    shading, performed by the computer system, the color of a subset of the one or more cells based on the transaction value of the data entries assigned to the cells in the subset; and
    calculating, performed by the computer system, a cell space value for the one or more cells, wherein the cell space value corresponds to a ratio of a total value of the cell's stack divided by an area of the cell.

16. The method, as set forth in claim 15, comprising:
    sorting the partitioned data entries by stack type into a plurality of stacks.

17. The method, as set forth in claim 16, comprising:
    assigning a different foundation color to each of the plurality of stacks.

18. The method, as set forth in claim 15, comprising:
    displaying the one or more cells in a graphical bar, wherein the one or more cells are ordered from a lower left section of a bar to an upper right section of the graphical bar.

* * * * *

UNITED STATES PATENT AND TRADEMARK OFFICE
CERTIFICATE OF CORRECTION

PATENT NO.         : 7,779,344 B1
APPLICATION NO.    : 11/590188
DATED              : August 17, 2010
INVENTOR(S)        : Ming C. Hao et al.

Page 1 of 1

It is certified that error appears in the above-identified patent and that said Letters Patent is hereby corrected as shown below:

In column 1, line 41, below "BRIEF DESCRIPTION OF THE DRAWINGS" insert -- The patent or application file contains at least one drawing executed in color. Copies of this patent or patent application publication with color drawing(s) will be provided by the Office upon request and payment of the necessary fee. --.

Signed and Sealed this
Twenty-sixth Day of April, 2011

David J. Kappos
*Director of the United States Patent and Trademark Office*